United States Patent
Ikerd et al.

(10) Patent No.: US 10,981,699 B2
(45) Date of Patent: Apr. 20, 2021

(54) COOLANT CAP MIX-UP PREVENTION SYSTEM FOR MOTOR VEHICLE

(71) Applicant: Ford Global Technologies, LLC, Dearborn, MI (US)

(72) Inventors: Jeremy Richard Ikerd, Eastpointe, MI (US); Kenneth J. Jackson, Dearborn, MI (US); Serdar Hakki Yonak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/874,917

(22) Filed: Jan. 19, 2018

(65) Prior Publication Data

US 2019/0225386 A1    Jul. 25, 2019

(51) Int. Cl.
  *B65D 41/04*    (2006.01)
  *B65D 1/02*    (2006.01)
  *F01P 3/20*    (2006.01)

(52) U.S. Cl.
  CPC .......... *B65D 41/04* (2013.01); *B65D 1/0246* (2013.01); *F01P 3/20* (2013.01)

(58) Field of Classification Search
  CPC ........ B65D 41/04; B65D 1/0246; B65D 1/02; B65D 43/0204; B65D 2251/1041; B65D 2251/105; F01P 3/20; F01P 3/12; F01P 2050/24; F01P 7/165; B60K 15/03006; B60T 11/26; B60T 17/06; B60T 11/16
  USPC ........ 220/562, 202, 203, 360, 361, 366, 367
  See application file for complete search history.

(56) References Cited

U.S. PATENT DOCUMENTS

| | | | | |
|---|---|---|---|---|
| 3,910,451 | A * | 10/1975 | Tusing | F01P 11/0238 220/203.26 |
| 4,787,445 | A * | 11/1988 | Howcroft | B60K 13/04 220/564 |
| 8,430,151 | B2 | 4/2013 | Kim | |
| 8,448,696 | B2 | 5/2013 | Johnston et al. | |
| 2009/0205346 | A1 | 8/2009 | Major et al. | |
| 2010/0116482 | A1* | 5/2010 | Goto | C08L 77/06 165/173 |
| 2010/0206882 | A1* | 8/2010 | Wessels | F01P 11/029 220/562 |
| 2012/0168138 | A1 | 7/2012 | Myers et al. | |
| 2016/0160740 | A1 | 6/2016 | Camera et al. | |
| 2016/0186650 | A1* | 6/2016 | Rollinger | F01P 11/18 701/102 |
| 2017/0284586 | A1* | 10/2017 | Ramirez | F16L 55/1152 |
| 2019/0097288 | A1* | 3/2019 | Oh | H01M 10/6569 |

(Continued)

OTHER PUBLICATIONS

Stern, Daniel, "Cooling system: to surprisingly wide range of radiator caps," printed Oct. 20, 2017 from https://www.allpar.com/fix/engines/cooling-cpas.html.

(Continued)

*Primary Examiner* — Shawn M Braden
(74) *Attorney, Agent, or Firm* — David B. Kelley; Carlson, Gaskey & Olds, P.C.

(57) ABSTRACT

This disclosure relates to a coolant cap mix-up prevention system for a motor vehicle. In one example, a motor vehicle includes a first coolant bottle configured for use with a first cap and a second coolant bottle configured for use with a second cap. The second coolant bottle is configured prevent attachment of the first cap to the second coolant bottle. A method is also disclosed.

22 Claims, 5 Drawing Sheets

(56) References Cited

U.S. PATENT DOCUMENTS

2019/0107038 A1* 4/2019 Noppakunkajorn .......................... B65D 41/0471
2019/0112966 A1* 4/2019 Schoeneman .......... F01P 11/029

OTHER PUBLICATIONS

Smart, Jim. "Troubleshoot Overheating: Most boil-vers can be prevented with the right parts, coolant mixture, and knowledge." Mustang 360. Aug. 28, 2005. Printed Oct. 23, 2017 from http://www.mustangandfords.com/how-to/engine/mump-0508-car-overheating-problems-troubleshooting/.

D'antonio, Steve. "Understanding Your Coolant Recovery Tank," Cruising World, May 27, 2015. Printed Oct. 20, 2017 from https://www.cruisingworld.com/understanding-coolant-recovery-bottles.

* cited by examiner

COOLANT CAP MIX-UP PREVENTION SYSTEM FOR MOTOR VEHICLE

TECHNICAL FIELD

This disclosure relates to a coolant cap mix-up prevention system for a motor vehicle.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Electrified vehicles, and in particular hybrid vehicles, present unique thermal management challenges. Some electrified vehicles are known to include a plurality of vehicle cooling systems, which generally use fluid to regulate the temperature of various powertrain components. Each of the cooling systems is a closed-loop system, and the fluids within respective systems are typically maintained at different operating pressures.

SUMMARY

A motor vehicle according to an exemplary aspect of the present disclosure includes, among other things, a first coolant bottle configured for use with a first cap and a second coolant bottle configured for use with a second cap. The second coolant bottle is configured to prevent attachment of the first cap to the second coolant bottle.

In a further non-limiting embodiment of the foregoing motor vehicle, the first coolant bottle is configured to prevent attachment of the second cap to the first coolant bottle.

In a further non-limiting embodiment of any of the foregoing motor vehicles, the first cap is rated for use at a different pressure than the second cap.

In a further non-limiting embodiment of any of the foregoing motor vehicles, the first cap is rated for use at a pressure of less than or equal to about 10 psi and the second cap is rated for use at a pressure of greater than or equal to about 20 psi.

In a further non-limiting embodiment of any of the foregoing motor vehicles, the first coolant bottle has a neck with an exterior and an interior, the second coolant bottle has a neck with an exterior and an interior, and the interior of the neck of the second coolant bottle is configured to interfere with the first bottle cap, thereby preventing attachment of the first bottle cap to the second coolant bottle.

In a further non-limiting embodiment of any of the foregoing motor vehicles, the neck of the first coolant bottle is configured to interfere with the second bottle cap, thereby preventing attachment of the second bottle cap to the first coolant bottle.

In a further non-limiting embodiment of any of the foregoing motor vehicles, the exteriors of the necks of the first and second coolant bottles are configured for attachment to a common tool.

In a further non-limiting embodiment of any of the foregoing motor vehicles, the exteriors of the necks of the first and second coolant bottles are threaded.

In a further non-limiting embodiment of any of the foregoing motor vehicles, the first cap has an outer flange and an inner flange, the second cap has an outer flange and an inner flange, and the interior of the neck of the second coolant bottle is configured to interfere with the inner flange of the first cap, thereby preventing attachment of the first cap to the second coolant bottle.

In a further non-limiting embodiment of any of the foregoing motor vehicles, a diameter of the interior of the neck of the second coolant bottle is less than a diameter of the inner flange of the first cap.

In a further non-limiting embodiment of any of the foregoing motor vehicles, the neck of the first coolant bottle is configured to interfere with the inner flange of the second cap, thereby preventing attachment of the second cap to the first coolant bottle.

In a further non-limiting embodiment of any of the foregoing motor vehicles, an inner surface of the outer flange of the first cap is threadless, a rib projects from an exterior of the inner flange, and the interior of the neck of the first coolant bottle includes a recess configured to receive the rib, thereby attaching the first cap to the first coolant bottle.

In a further non-limiting embodiment of any of the foregoing motor vehicles, an inner surface of the outer flange of the second cap is threaded and configured for attachment to the exterior of the neck of the second coolant bottle, thereby attaching the second cap to the second coolant bottle.

In a further non-limiting embodiment of any of the foregoing motor vehicles, the neck of the first coolant bottle includes a rim, the rim configured to contact a seat projecting from the inner flange of the second cap, thereby preventing the threads of the second cap from engaging the exterior of the neck of the first coolant bottle.

A method according to an exemplary aspect of the present disclosure includes, among other things, preventing a mix-up of a first cap configured for use with a first coolant bottle and a second cap configured for use with a second coolant bottle by preventing attachment of the first cap to the second coolant bottle.

In a further non-limiting embodiment of the foregoing method, the method includes preventing attachment of the second cap to the first coolant bottle.

In a further non-limiting embodiment of any of the foregoing methods, the first cap is rated for use at a different pressure than the second cap.

In a further non-limiting embodiment of any of the foregoing methods, the first cap is rated for use at a pressure of less than or equal to about 10 psi and the second cap is rated for use at a pressure of greater than or equal to about 20 psi.

In a further non-limiting embodiment of any of the foregoing methods, the method includes attaching the first cap to the first coolant bottle and attaching the second cap to the second coolant bottle.

In a further non-limiting embodiment of any of the foregoing methods, the method includes attaching a common tool to the first coolant bottle, filling the first coolant bottle with fluid via the common tool, attaching the common tool to the second coolant bottle, and filling the second coolant bottle with fluid via the common tool.

DETAILED DESCRIPTION

This disclosure relates to a coolant cap mix-up prevention system for a motor vehicle. In one example, a motor vehicle includes a first coolant bottle configured for use with a first cap and a second coolant bottle configured for use with a second cap. The second coolant bottle is configured to prevent attachment of the first cap to the second coolant bottle. In this way, a cap rated for use at relatively low pressures is not inadvertently attached to a coolant bottle configured for use with relatively high pressure fluid.

Figure 1:
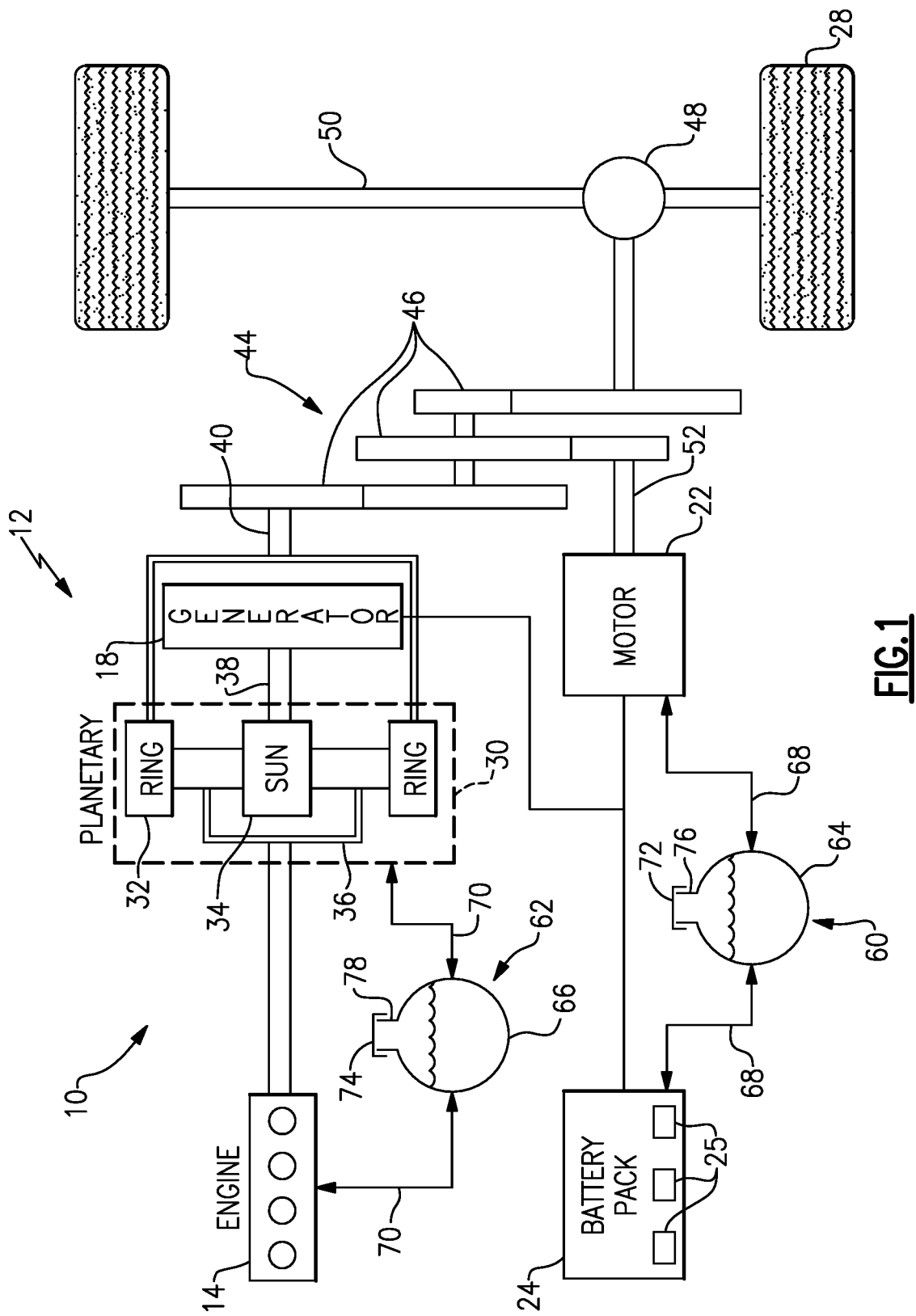
FIG. 1 schematically illustrates a powertrain of an electrified vehicle.

Referring to the drawings, FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs). This disclosure also extends to conventional motor vehicles which rely exclusively on internal combustion engines.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, micro hybrids, plug-in hybrids, and battery electric vehicles. This disclosure also extends to motor vehicles that are not electrified vehicles, including motor vehicles having only an internal combustion engine.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. In another example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

The electrified vehicle 12 further includes a first cooling system 60 and a second cooling system 62. The first and second cooling systems 60, 62, which are schematically illustrated in FIG. 1, are independent, closed-loop systems. The first and second cooling systems 60, 62 are configured to direct fluid to various components of the electrified vehicle 12 in order to thermally manage those systems. This disclosure is not limited to any particular fluid types, but, in some examples, the first and second cooling systems 60, 62 are configured to direct fluids such as water, methanol, a mixture of methanol and water, propylene glycol, a mixture of propylene glycol and water, glycerol, a mixture of glycerol and water, ethylene glycol, a mixture of ethylene glycol and water, synthetic oil, other types of oil, liquid dielectric cooling fluid, and the like.

In general, the first and second cooling systems 60, 62 are configured to maintain their respective fluids at different operating pressures, as needed, to achieve desired levels of thermal management. For example, maintaining a relatively high operating pressure may allow the fluid within the system to absorb more thermal energy without undergoing a phase change from liquid to gas, which is beneficial in certain applications. Other systems, however, can achieve sufficient cooling without a high pressure fluid.

In this disclosure, the first and second cooling systems 60, 62 each include a respective first and second coolant bottle 64, 66. The first and second coolant bottles 64, 66 serve as reservoirs for the fluid within the respective first and second cooling systems 60, 62. Fluid within the first and second coolant bottles 64, 66 may be in more than one phase. In one particular example, the bottom portion of the coolant bottles 64, 66 may contain fluid in a liquid state, while a top portion of the coolant bottles may contain fluid in a gaseous state.

Each of the first and second cooling systems 60, 62 are in communication with first and second conduit arrangements 68, 70, which are arranged and configured to fluidly couple the fluid within each of the first and second cooling systems 60, 62 to various components of the electrified vehicle 12. The first and second conduit arrangements 68, 70 may each include one or more delivery and return lines, valves, and pumps, depending on the particular application.

In the example of FIG. 1, the first cooling system 60 is fluidly coupled, by way of the first conduit arrangement 68, to the battery pack 24 and the motor 22. In another example, the first cooling system 60 is fluidly coupled to the battery pack 24, an inverter (ISC) and a DC-to-DC charger. The second cooling system 62 is fluidly coupled, by way of the second conduit arrangement 70, to the engine 14 and the power transfer unit 30. In another example, the second cooling system 62 is coupled to a heater core in addition to the engine 14. It should be understood that the disclosed arrangements are exemplary only, and the first and second cooling systems 60, 62 could be fluidly coupled to other components of the electrified vehicle 12.

The first and second coolant bottles 64, 66, in this example, are each configured for use with a respective cap 72, 74, which are configured to attach to a neck 76, 78 of a respective one of the first and second bottles 64, 66. The attachment between the caps 72, 74 and the necks 76, 78 may be a threaded connection or some other type of connection, as discussed below. The caps 72, 74 are selectively removed from a respective neck 76, 78 in order to allow one to fill, or refill, the coolant systems 60, 62 with fluid, as needed.

In this disclosure, the first and second coolant systems 60, 62 are configured to maintain the fluid within their respective systems at different operating pressures. In one example, the first coolant system 60 is configured to maintain the fluid within its system at a relatively low operating pressure during operation, whereas the second coolant system 62 is configured to maintain the fluid within its system at a relatively high operating pressure during operation. The opposite could be true, however. Namely, the first coolant system 60 could be configured to maintain the fluid within its system at a higher pressure than the second coolant system 62.

The caps 72, 74 must be configured to work in their respective operating environments. In particular, in the example where the second coolant system 62 is configured to maintain fluid at relatively high operating pressures, the cap 74 must be configured to remain attached to the neck 78 in those conditions. This disclosure provides a system that prevents one from mixing-up the caps 72, 74, and accidentally placing a low-pressure cap on a bottle of a coolant system configured to operate at high pressures. This disclosure also allows for uniform attachment of the necks 76, 78 to a tool configured to fill the coolant systems with fluid. Example caps 72, 74 and necks 76, 78 will now be described in detail relative to FIGS. 2-5, below.

Figure 2:
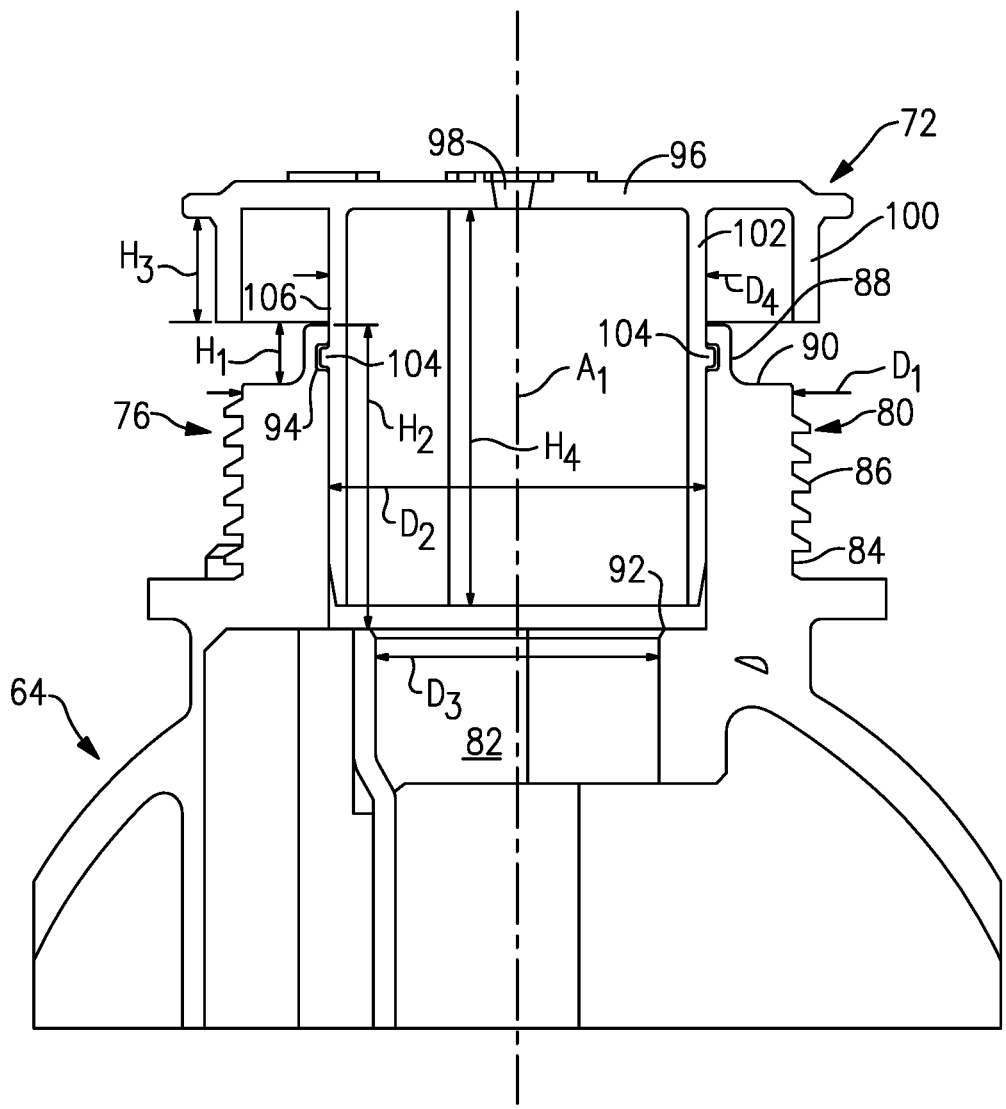
FIG. 2 is a cross-sectional view of a portion of a first coolant bottle, and in particular illustrates a cap attached to a neck of the first coolant bottle.

FIG. 2 illustrates, in cross-section, a top portion of the first coolant bottle 64, and in particular illustrates the arrangement between the cap 72 and the neck 76 of the first coolant bottle 64. In this example, the first coolant bottle 64 is configured for use with relatively low pressure fluid, such as fluid maintained at pressure of less than or equal to about 10 psi during operation of the electrified vehicle 12. Likewise, the cap 72 is configured to remain attached to the neck 76 when exposed to such pressures.

The neck 76 is disposed about an axis $A_1$, and has an exterior 80 and an interior 82. The exterior 80 is provided by a cylindrical surface 84 having a diameter $D_1$. The cylindrical surface 84 includes threads 86, in this example, which are configured to mate with threads of a coupling of a filling tool, which is configured to fill, or refill, the first coolant bottle 64 with fluid.

In this example, the neck 76 includes a rim 88 projecting upward from a top 90 of the cylindrical surface 84 by a height $H_1$. The rim 88 is spaced inwardly (i.e., toward the axis $A_1$) from the cylindrical surface 84.

In interior 82 of the neck 76 is stepped in this example. Beginning from a top of the rim 88, the interior of the neck has a first diameter $D_2$ along a first height $H_2$ thereof, and a second, reduced diameter $D_3$ near a base 92 of the neck 76. The interior 82 of the neck 76, in this example, includes a recess 94 adjacent the rim 88. The recess 94 is configured to cooperate with a rib of the cap 72 to attach the cap 72 of the neck 76, as will be discussed below.

The cap 72, in this example, includes a top portion 96. The top portion 96, in this example, includes a port 98 configured to release gaseous fluid within the first coolant bottle 64. The top portion 96 may be solid in some examples, however. An outer flange 100 and an inner flange 102 project downward from the top portion 96. The outer and inner flanges 100, 102 are concentric and are spaced-apart from one another. Further, the outer and inner flanges 100, 102 are cylindrical in this example. The outer flange 100 has a first height $H_3$ and the inner flange 102 has a second height $H_4$, which is greater than the first height $H_3$. The inner flange 102 has a diameter $D_4$ sized for receipt in the first diameter $D_2$ of the interior of the neck 76.

The inner flange 102 includes a rib 104 projecting from an exterior surface 106 thereof. The rib 104 is positioned and sized for receipt in the recess 94. In order to attach the cap 72 to the neck 76, a user presses the cap 72 onto the neck 76, which causes the rib 104 to be positioned in the recess 94. The connection between the rib 104 and the recess 94 is sufficient to keep the cap 72 attached to the neck 76 in relatively low pressure conditions.

Figure 3:
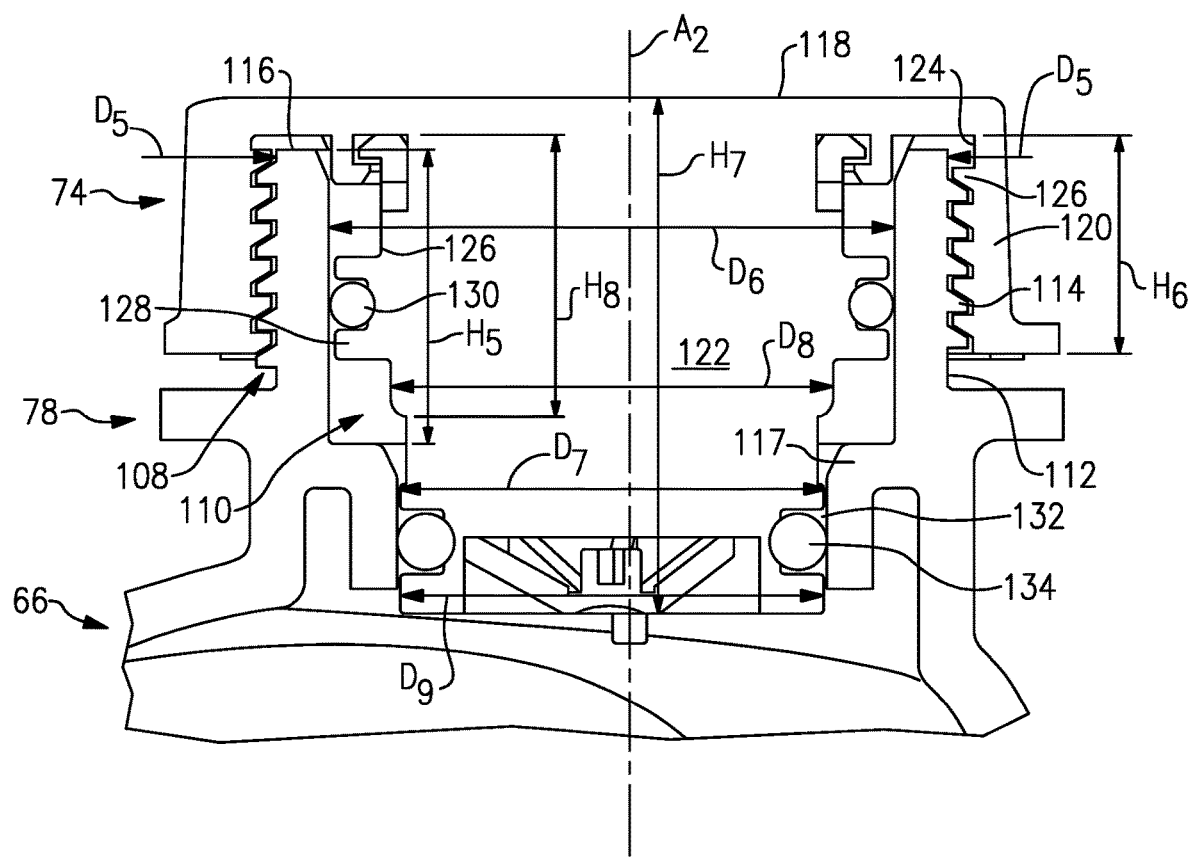
FIG. 3 is a cross-sectional view of a portion of a second coolant bottle, and in particular illustrates a cap attached to a neck of the second coolant bottle.

FIG. 3 illustrates, in cross-section, a top portion of the second coolant bottle 66, and in particular illustrates the arrangement between the cap 74 and the neck 78 of the second coolant bottle 66. In this example, the second coolant bottle 66 is configured for use with relatively high pressure fluid, such as fluid maintained at pressure of greater than or equal to about 20 psi during operation of the electrified vehicle 12. Likewise, the cap 74 is configured to remain attached to the neck 78 when exposed to such pressures.

The neck 78 is disposed about an axis $A_2$, and includes an exterior 108 and an interior 110. The exterior 108 is provided by a cylindrical surface 112 having a diameter $D_5$. The cylindrical surface 112 includes threads 114, in this example, which are configured to mate with threads of a coupling of a filling tool, which is configured to fill, or refill, the first and second coolant bottles 64, 66 with fluid. In this way, the first and second coolant bottles 64, 66 can be refilled by a common tool. Further, the threads 114 are configured to mate with corresponding threads of the cap 74, as discussed below.

The interior 110 of the neck 78 is stepped. Beginning at a top 116 of the cylindrical surface 112, the interior 110 has a first diameter $D_6$ along a first height $H_5$. Near a base 117 of the neck 78, the neck 78 has a second diameter $D_7$ less than the first diameter $D_6$.

The cap 74 includes a top portion 118, which in this example is solid and does not include any ports or vents. The cap 74 further includes an outer flange 120 and an inner flange 122 projecting downward from the top portion 118. The outer and inner flanges 120, 122 are concentric, generally cylindrical, and spaced-apart from one another. The outer and inner flanges 120, 122 project downward from the top portion 118 by respective first and second heights $H_6$, $H_7$. The second height $H_7$ is greater than the first height $H_6$.

The outer flange 120 has an inner surface 124 that includes threads 126 configured to mate with the threads 114 of the neck 78. In order to attach the cap 74 to the neck 78, a user threads the cap 74 onto the neck 78. The threaded attachment is sufficient to keep the cap 74 attached to the neck 78 in relatively high pressure conditions.

The inner flange 122 of the cap 74 is stepped, in this example. Beginning at the top portion 118, the inner flange 122 has a height $H_8$ having a first diameter $D_8$. Along this section of the inner flange 122, an exterior surface 126 of the inner flange 122 includes a plurality of ribs projecting therefrom to provide a seat 128. The seat 128 receives a seal 130, such as an O-ring. The inner flange 122, the seat 128, and the seal 130 are sized to provide direct contact between the seal 130 and the interior 110 of the neck 78 along its height $H_5$.

Downward of the height $H_8$, the balance of the cap 74 has a second diameter $D_9$, which is a reduced diameter relative to the first diameter $D_8$. Along this section of the inner flange 122, the inner flange 122 includes a recess providing another seat 132 receiving another seal 134, such as an O-ring. The inner flange 122 and the seal 134 are sized to provide direct contact between the seal 134 and the interior of the neck 110 adjacent the base 117 of the neck 78.

In this disclosure, in order to prevent a coolant cap mix-up, the first coolant bottle 64 is configured to prevent attachment of the cap 74 to the first coolant bottle 64. Further, the second coolant bottle 66 is configured to prevent attachment of the cap 72 to the second coolant bottle 66. In this way, a low pressure-rated cap, such as the cap 72, will not inadvertently be placed on a coolant bottle configured for use with a high pressure fluid, such as the second coolant bottle 66.

While in this disclosure the cap 72 cannot attach to the second coolant bottle 66 and the cap 74 cannot attach to the first coolant bottle 64, this disclosure extends to mix-up prevention systems wherein only one of the bottles is configured to prevent attachment to one of the caps. In an electrified vehicle having only two coolant bottles, for example, a user would know that there has been a cap mix-up when one cap does not attach to one of the coolant bottles, despite the other cap having been attached.

Figure 4:
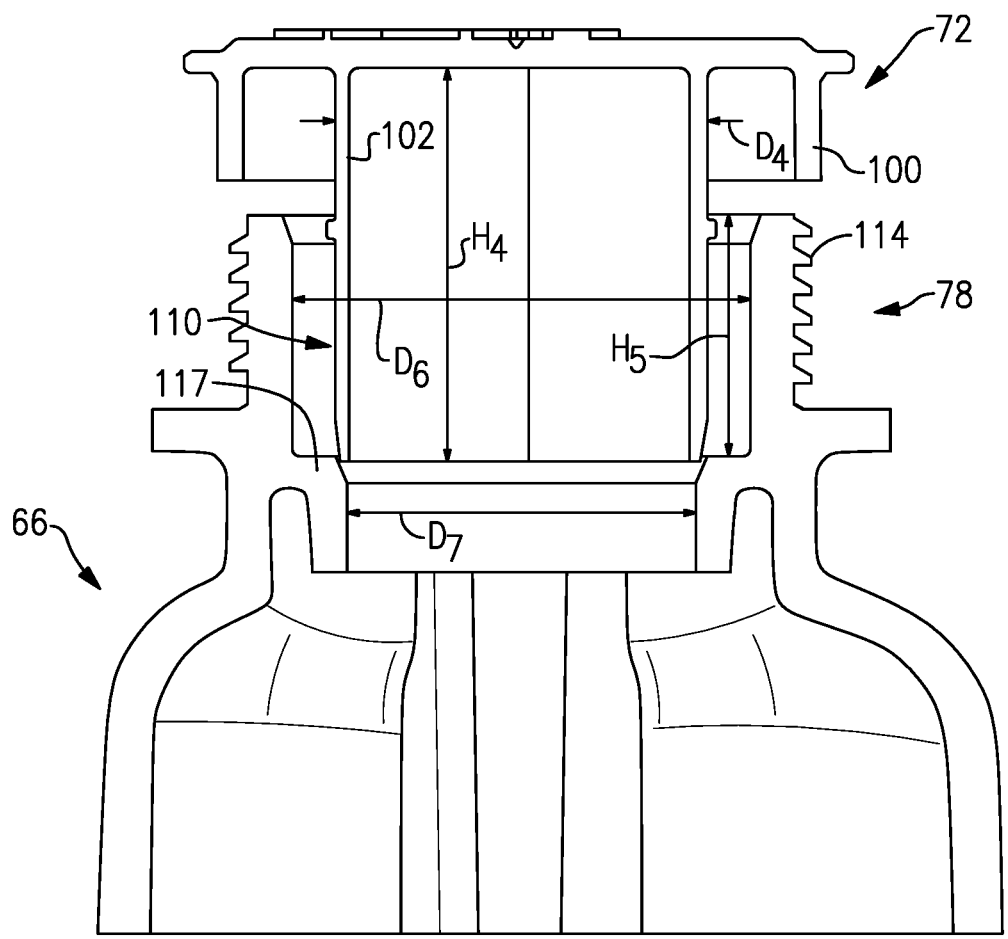
FIG. 4 is a cross-sectional view illustrating an interaction between the second coolant bottle and a cap configured for use with the first coolant bottle.
Figure 5:
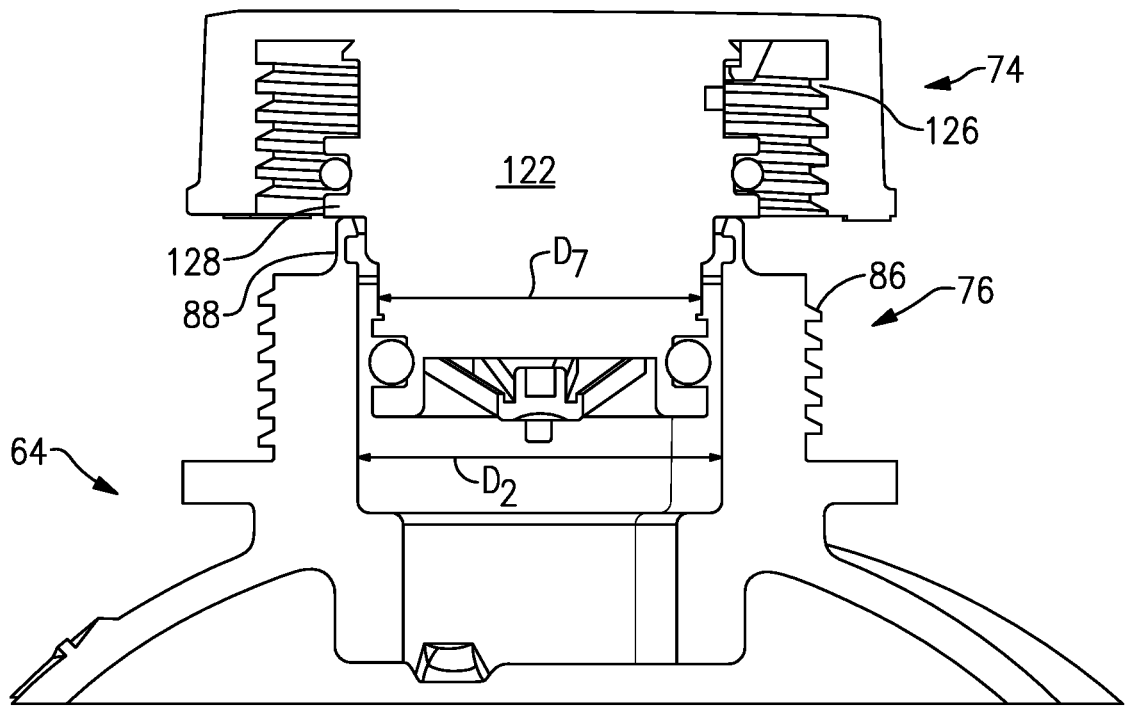
FIG. 5 is a cross-sectional view illustrating an interaction between the first coolant bottle and a cap configured for use with the second coolant bottle.

FIGS. 4 and 5 illustrate the interaction between the caps 72, 74 and the necks 76, 78 when there has been a cap mix-up. In other words, FIGS. 4 and 5 show the interaction when a user attempts to attach the cap 72 to the neck 78, and the cap 74 to the neck 76.

In FIG. 4, a user has attempted to attach the cap 72 to the neck 78 of the second coolant bottle 66. The cap 72, in this example, is rated for use at relatively low pressures, whereas the second coolant bottle 66 is configured for use with relatively high pressure fluids. Thus, it is not desirable to attach the cap 72 to the second coolant bottle 66.

Here, when one attempts to attach the cap 72 to the second coolant bottle 66, the interior 110 of the neck 78 of the second coolant bottle 66 is configured to interfere with the cap 72, thereby preventing attachment of the cap 72 to the second coolant bottle 66. In particular, the inner flange 102 of the cap 72 abuts the base 117 of the neck 78, preventing the cap 72 from being fully seated adjacent the neck 78. In particular, the diameter $D_4$ of the inner flange 102 is less than the diameter $D_6$ of the interior 110, but is greater than the diameter $D_7$. Further, the relationship of the height $H_4$ of the inner flange, as compared to the first height $H_5$ of the interior 110 of the neck 78, prevents the outer flange 100 from contacting the neck 78, which otherwise may have given a user a false sense that the cap 72 was properly attached to the neck 78. To this end, as an added check, the interior of the outer flange 100 is not threaded, and thus cannot threadably engage with the threads 114 of the neck 78.

In FIG. 5, a user has attempted to attached the cap 74 to the neck 76 of the first coolant bottle 64. The cap 74 is rated for use at relatively high pressures, whereas the first coolant bottle 64 is configured for use with relatively low pressure fluids. Thus, it is not desirable to attach the cap 74 to the first coolant bottle 64, namely because in a two-cap system, for example, doing so means that a user has attached, or will attempt to attach, the cap 72 to the second coolant bottle 66.

Here, when one attempts to attach the cap 74 to the first coolant bottle 64, the neck 76 of the first coolant bottle 64 is configured to interfere with the cap 74, thereby preventing attachment of the cap 74 to the first coolant bottle 64. In particular, the neck 76 is configured to interference with the inner flange 122 of the cap 74. The portion of the cap 74 having the reduced diameter $D_7$ is less than the diameter $D_2$, but the ribs forming the seat 128 provide the cap 74 with a dimension larger than the diameter $D_2$. Thus, when a user attempts to attach the cap 74 to the neck 76, the seat 128 contacts the top of the rim 88, which prevents further insertion of the cap 74 relative to the neck 76. In particular, the seat 128 rim 88 are arranged such that the threads 126 of the cap 74 will not threadably engage the threads 86 of the neck 76.

It should be understood that terms such as "top," "bottom," "upward," "downward," "inward," and "outward" are directional terms made with reference to the normal operational attitude of the components being described. These directional terms are used for purposes of explanation only, and should not otherwise be considered to be limiting. Further, terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a first cooling system;
   a second cooling system, wherein the first and second cooling systems are each closed-loop systems and are independent of one another;
   a first coolant bottle configured for use with a first cap, wherein the first cooling system includes the first coolant bottle; and
   a second coolant bottle configured for use with a second cap, wherein the second coolant bottle is configured to prevent attachment of the first cap to the second coolant bottle, and wherein the second cooling system includes the second coolant bottle.

2. The motor vehicle as recited in claim 1, wherein the first coolant bottle is configured to prevent attachment of the second cap to the first coolant bottle.

3. The motor vehicle as recited in claim 1, wherein the first cap is rated for use at a different pressure than the second cap.

4. The motor vehicle as recited in claim 3, wherein the first cap is rated for use at a pressure of less than or equal to about 10 psi and the second cap is rated for use at a pressure of greater than or equal to about 20 psi.

5. The motor vehicle as recited in claim 1, wherein:
   the first coolant bottle has a neck with an exterior and an interior,
   the second coolant bottle has a neck with an exterior and an interior, and
   the interior of the neck of the second coolant bottle is configured to interfere with the first bottle cap, thereby preventing attachment of the first bottle cap to the second coolant bottle.

6. The motor vehicle as recited in claim 5, the neck of the first coolant bottle is configured to interfere with the second bottle cap, thereby preventing attachment of the second bottle cap to the first coolant bottle.

7. The motor vehicle as recited in claim 5, wherein the exteriors of the necks of the first and second coolant bottles are configured for attachment by a common tool.

8. The motor vehicle as recited in claim 5, wherein the exteriors of the necks of the first and second coolant bottles are threaded.

9. The motor vehicle as recited in claim 5, wherein:
   the first cap has an outer flange and an inner flange,
   the second cap has an outer flange and an inner flange, and
   the interior of the neck of the second coolant bottle is configured to interfere with the inner flange of the first cap, thereby preventing attachment of the first cap to the second coolant bottle.

10. The motor vehicle as recited in claim 9, wherein a diameter of the interior of the neck of the second coolant bottle is less than a diameter of the inner flange of the first cap.

11. The motor vehicle as recited in claim 9, wherein the neck of the first coolant bottle is configured to interfere with the inner flange of the second cap, thereby preventing attachment of the second cap to the first coolant bottle.

12. The motor vehicle as recited in claim 9, wherein:
   an inner surface of the outer flange of the first cap is threadless,
   a rib projects from an exterior of the inner flange, and
   the interior of the neck of the first coolant bottle includes a recess configured to receive the rib, thereby attaching the first cap to the first coolant bottle.

13. The motor vehicle as recited in claim 12, wherein an inner surface of the outer flange of the second cap is threaded and configured for attachment to the exterior of the neck of the second coolant bottle, thereby attaching the second cap to the second coolant bottle.

14. The motor vehicle as recited in claim 13, wherein the neck of the first coolant bottle includes a rim, the rim configured to contact a seat projecting from the inner flange of the second cap, thereby preventing the threads of the second cap from engaging the exterior of the neck of the first coolant bottle.

15. A method, comprising:
   preventing a mix-up of a first cap configured for use with a first coolant bottle and a second cap configured for use with a second coolant bottle by preventing attachment of the first cap to the second coolant bottle, wherein a first cooling system includes the first coolant bottle and a second cooling system includes the second coolant bottle, and wherein the first and second cooling systems are each closed-loop systems and are independent of one another.

16. The method as recited in claim 15, further comprising:
   preventing attachment of the second cap to the first coolant bottle.

17. The method as recited in claim 16, wherein the first cap is rated for use at a different pressure than the second cap.

18. The method as recited in claim 17, wherein the first cap is rated for use at a pressure of less than or equal to about 10 psi and the second cap is rated for use at a pressure of greater than or equal to about 20 psi.

19. The method as recited in claim 15, further comprising:
   attaching the first cap to the first coolant bottle; and
   attaching the second cap to the second coolant bottle.

20. The method as recited in claim 15, further comprising:
   filling the first coolant bottle with fluid via a common tool; and
   filling the second coolant bottle with fluid via the common tool.

21. The motor vehicle as recited in claim 1, wherein the first cooling system is configured to thermally manage a battery pack of the motor vehicle, and wherein the second cooling system is configured to thermally manage an internal combustion engine of the motor vehicle.

22. The method as recited in claim 15, wherein the first cooling system is configured to thermally manage a battery pack of a motor vehicle, and wherein the second cooling system is configured to thermally manage an internal combustion engine of the motor vehicle.

* * * * *